US008267438B2

(12) United States Patent
Radzik et al.

(10) Patent No.: US 8,267,438 B2
(45) Date of Patent: Sep. 18, 2012

(54) TWO-PIECE FLANGE ADAPTER

(75) Inventors: Joseph G. Radzik, West Warwick, RI (US); Mark J. Estrella, Seekonk, MA (US); Mark S. DeFilippo, North Scituate, RI (US)

(73) Assignee: Tyco Fire Products LP, Lansdale, PA (US)

( * ) Notice: Subject to any disclaimer, the term of this patent is extended or adjusted under 35 U.S.C. 154(b) by 914 days.

(21) Appl. No.: 11/775,931

(22) Filed: Jul. 11, 2007

(65) Prior Publication Data
US 2010/0187812 A1    Jul. 29, 2010

Related U.S. Application Data

(60) Provisional application No. 60/892,434, filed on Mar. 1, 2007.

(51) Int. Cl.
*F16L 23/04* (2006.01)
(52) U.S. Cl. ........ 285/415; 285/367; 285/411; 285/413; 285/420; 277/626
(58) Field of Classification Search .......... 285/367–368, 285/411–413, 415, 420, 95, 110–112
See application file for complete search history.

(56) References Cited

U.S. PATENT DOCUMENTS

| | | | |
|---|---|---|---|
| 863,887 A * | 8/1907 | Stuttle | 285/373 |
| 1,913,030 A * | 6/1933 | Hux | 277/336 |
| 2,911,239 A | 11/1959 | Marzolf | |
| 3,153,550 A | 10/1964 | Hollett | |
| 3,761,114 A * | 9/1973 | Blakeley | 285/111 |
| 3,861,722 A | 1/1975 | Kenyon | |
| 3,895,833 A | 7/1975 | Thiessen | |
| 4,372,587 A | 2/1983 | Roche | |
| 4,896,902 A * | 1/1990 | Weston | 285/93 |
| 5,058,931 A | 10/1991 | Bowsher | |
| 5,209,524 A | 5/1993 | Corwon et al. | |
| 5,246,257 A * | 9/1993 | Kojima et al. | 285/112 |
| 6,076,861 A * | 6/2000 | Ikeda | 285/112 |

(Continued)

OTHER PUBLICATIONS

International Preliminary Report on Patentability including Aug. 4, 2008 Written Opinion of PCT/US2008/55549; Sep. 1, 2009; 7 pages.

(Continued)

*Primary Examiner* — Aaron Dunwoody
*Assistant Examiner* — Fannie Kee
(74) *Attorney, Agent, or Firm* — Perkins Coie LLP (57) ABSTRACT

A two-piece flange adapter including two identical flange parts. Each flange part has two ends, with each end having a planar mating surface disposed at each end of the channel disposed on an inner diameter surface of the flange part. A projection extends from one planar mating surface and is formed to continue the channel for a predetermined distance past the planar mating surface. The other end of the flange and channel define a groove having a depth that accepts the projection of a mating flange part to form a complete channel. A gasket having a cross-sectional area with an internal cavity is compressively disposed in a pocket defined by the channel and the mating pipes. The cross-sectional area of the gasket occupies less than 87% of the pocket and can also occupy approximately 82-84% of the pocket.

17 Claims, 7 Drawing Sheets

U.S. PATENT DOCUMENTS

| | | | | |
|---|---|---|---|---|
| 6,139,069 | A * | 10/2000 | Radzik | 285/112 |
| 6,227,577 | B1 * | 5/2001 | Ikeda et al. | 285/112 |
| 6,264,251 | B1 | 7/2001 | Kunsman et al. | |
| 6,302,452 | B1 | 10/2001 | Schlicht | |
| 6,315,335 | B1 | 11/2001 | Seedorff | |
| 7,086,131 | B2 * | 8/2006 | Gibb et al. | 29/282 |
| 7,111,876 | B2 | 9/2006 | Hayashi et al. | |
| 2003/0178850 | A1 * | 9/2003 | Dole et al. | 285/420 |
| 2005/0223770 | A1 * | 10/2005 | Dole | 72/122 |
| 2005/0253380 | A1 * | 11/2005 | Gibb et al. | 285/111 |
| 2005/0253382 | A1 * | 11/2005 | Gibb et al. | 285/111 |

OTHER PUBLICATIONS

International Search Report and Written Opinion of PCT/US2008/055549; Aug. 4, 2008; 10 pages.

Gruvlok Data Sheet 5—Figure 7012 Gruvlok Flange; 2004; 6 pages; Anvil International, Inc., USA.

Vic-Flange Adapters—Styles 741 and 743; Oct. 2006; 8 pages; Victaulic Company; USA.

Victaulic I-100 Field Installation Handbook; undated; pp. 113-118; Victaulic Company; USA.

* cited by examiner

TWO-PIECE FLANGE ADAPTER

This application claims benefit of priority to U.S. Provisional Patent Application No. 60/892,434 filed Mar. 1, 2007 which is incorporated by reference in its entirety.

FIELD OF THE INVENTION

The subject invention relates to piping systems and, more particularly, to couplings and gaskets joining components of piping systems.

BACKGROUND OF THE INVENTION

A flange adapter is a multi-piece assembly that, when assembled, joins a grooved pipe to a flanged pipe. The assembled flange adapter has a grooved-pipe end with an inner diameter surface that fits over an end of the grooved pipe. The grooved-pipe end also has a tongue extending inwardly from the inner diameter surface that engages a groove on the outer surface of the grooved pipe. The grooved-pipe end of the flange adapter is typically secured to the grooved pipe by placing the tongue within the groove, and by assembling the multi-piece structure of the flange adapter together so that the groove retains the flange adapter on the end of the grooved pipe. The flange-end of the flange adapter has an adapter flange that engages a pipe flange on the flanged pipe. The pipe flange is typically secured to the adapter flange with bolts inserted through common bolt holes that pass through the flange adapter and the pipe flange. The inner diameter surface of the flange adapter also typically holds a gasket disposed between the facing ends of the grooved and flanged pipes to provide a seal between the pipes.

Existing flange adapter assemblies are believed to have several disadvantages. Existing flange adapters for pipes with diameters greater than 12 inches are believed to be made of four quarter-round components that must be joined together to form the flange assembly. Such four-piece flange assemblies require at lease four points of connection to connect each quarter-round component to adjacent components, which requires at least four connecting bolts and additional time to assemble as compared to a two-piece flange assembly. At each point of connection, each quarter-round component must also have additional material or reinforcement structures to provide support for connecting bolts joining one quarter-round to another quarter-round, which undesirably adds weight to the assembled four-piece flange assembly.

Some existing flange adapter systems are designed so that the common bolt holes connecting the adapter flange and pipe flange pass through two mating pieces of the flange adapter assembly, as described, for example, in U.S. Pat. Nos. 6,264,251, 6,315,335, and 7111876. In such an arrangement, the ends of each flange piece have areas-surrounding certain bolt holes that are about half the thickness of the remainder of the flange piece. When these half-thickness portions are aligned with an adjacent flange piece, the two portions together form an area having a thickness similar to the remainder of the flange piece and a single common bolt hole shared between the adjacent flange pieces. A disadvantage with such an arrangement is that the half-thickness portions of each flange piece are structurally weaker than areas of the flange pieces having a full thickness, and the change in flange piece thickness complicates the casting of the flange piece. Also, during assembly of two adjacent flange pieces, additional skill and time are required because the assembly requires the alignment of a common bolt and two or three components forming the common bolt hole, e.g., the simultaneous alignment of the common bolt, the alignment of the common bolt holes passing through the two mating half-thickness portions of the flange piece, and the alignment of the bolt hole passing through the pipe flange. In larger flange pieces having a greater weight, the manipulation and alignment of multiple components can be hazardous. Another disadvantage is realized when the flange adapter assembly includes both common bolt holes and circumferentially-aligned bolts joining one flange piece to another, as described in the Gruvlok Data Sheet 5 (2004) and the Vic-Flange Adapters product specification for Styles 741 and 743 (Rev. G, 10/2006), for example. When the circumferentially-align bolts are tightened, the movement of one flange piece towards the adjacent flange piece can subject the common bolt passing through the two half-thickness portions to undesirable shear forces.

Other existing flange adapter assemblies provide mating surfaces between adjacent flange pieces that are not planar, with a projection of one flange piece mating surface being inserted into a cavity in the mating surface of an adjacent flange piece. Such designs may prove to be problematic during assembly because the cavity is prone to capturing dirt and debris that could interfere with the proper seating of the projection within the cavity. Also, the available area of the mating surface is reduced by the positioning of the cavity within the mating surface. In such arrangements, the endmost portion of the projection may not contact the bottom of the cavity because the projection is designed to be shorter than the depth of the cavity so as to not bottom out. Since a portion of the mating surface is dedicated to the projection and cavity, which do not fully contact each other, the amount of contact between adjacent mating surfaces is undesirably reduced.

Yet other existing flange adapter designs have mating surfaces that come together near the gasket. It is believed that the pieces of a multi-piece flange adapter are loosely assembled in place on the grooved pipe, the gasket is inserted, the adapter flange is connected to the pipe flange, and the bolts connecting the adapter pieces are tightened. During this tightening, it is possible that the gasket could be pinched between the mating surfaces of adjacent flange pieces as those surfaces come together. An example of mating surfaces coming together near a gasket is described in the Victaulic I-100 Field Installation Handbook, pp. 113-118.

Thus, what is needed is a flange adapter that overcomes the disadvantages of existing designs by providing a two-piece flange adapter for pipe having diameters greater than 12 inches, while avoiding the use of shared bolt holes between flange pieces, providing an uninterrupted mating surface, and preventing the pinching of the gasket by adjacent flange pieces.

SUMMARY OF THE INVENTION

The preferred two-piece flange adapter has a two identical flange parts that mate with each other to form the two-piece flange, which are secured to each other with circumferentially-arranged bolt assemblies. Each flange part has an adapter flange that engages a flange of a flanged pipe, and an inner adapter surface with a tongue that extends towards a longitudinal axis of the flange part and engages a groove of a grooved pipe. The inner adapter surface also has a channel designed to hold a gasket. Each flange part also has two ends, with each end having a planar mating surface disposed at each end of the channel. The planar mating surfaces lie in the same plane, and the plane is parallel to and passes through the longitudinal axis. Extending from one of the planar mating surfaces is a projection disposed at one end of the channel, which is formed to extend the channel away from the end of the flange part and the planar mating surface by a predetermined distance. At the other end of the flange and channel, the channel terminates before reaching the planar mating surface to form a groove formed to receive the projection extending from another flange part. When assembled, the channel circumscribes the interior surface of the two-piece flange. Each end of the flange parts also includes an extension radially extending from each end away from the longitudinal axis, with circumferentially-disposed bolt holes therein that permit the assembly of one flange part to another flange part with the use of the circumferential bolt assemblies. Each extension also has an angled surface disposed adjacent to the respective planar mating surface such that, when assembled, the facing extensions of mating flange parts maintain a space between each extension.

The preferred gasket has an internal cavity permitting the entry of pressurized fluid against the gasket wall to compress the gasket walls and achieve a seal. When installed, the gasket is compressed within a pocket defined by the channel and the mating pipes. The pocket defines a cross-sectional area including the gasket and internal cavity, and the gasket cross-sectional area occupies less than 87% of the pocket cross-sectional area. The gasket cross-sectional area preferably occupies between approximately 82% and 84% of the pocket cross-sectional area, and most preferably occupies 83.6% of the pocket cross-sectional area for a 14, 16, 18, or 20 inch-diameter pipe and 83.8% of the pocket cross-sectional area for a 24 inch-diameter pipe.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

FIGS. 1-4 illustrate one part or piece 100 of the preferred two-piece flange adapter 101. The flange part 100 is preferably in the form of an arc extending approximately 180 degrees around a longitudinal axis 102 defined by the flange part 100. The flange part 100 has a flange body 104 having an outer diameter surface 106 and an inner diameter surface 108, with a series of longitudinal bolt holes 110 extending longitudinally through the flange body 104 and positioned radially from the longitudinal axis 102. The flange body 104 is reinforced with an outer ridge 112 and an inner ridge 114 circumferentially extending along the outer and inner diameter surfaces 106 and 108, respectively. Additional reinforcement is provided by radial ridges 116 extending along the flange body 104 between the outer ridge 112 and inner ridge 114. Pockets 118 are preferably formed between the flange body 104, outer ridge 112, inner ridge 114, and radial ridges 116 proximate to each of the series of bolt holes 110. The pockets 118 help to reduce the weight of the flange adapter 101 and to facilitate the casting of the flange part 100. The flange part 100 is preferably made of ductile iron, malleable iron, or cast iron, and most preferably made of ductile iron ASTM A536 Grade 65-45-12. The flange part 100 preferably weighs approximately 25 pounds (11.3 kgs) for an exemplary flange part suitably sized for a 14-inch grooved pipe.

Figure 3:
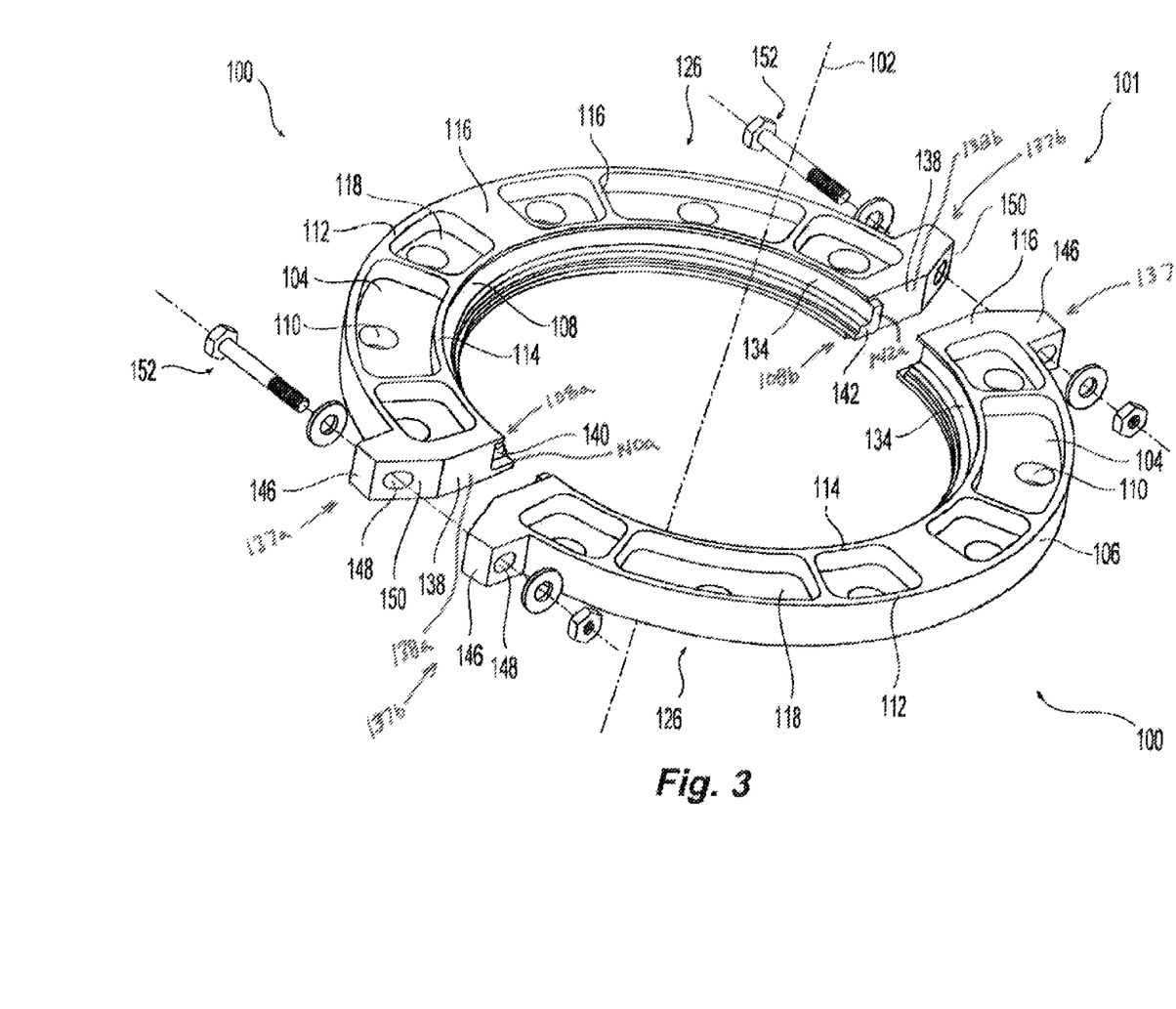
FIG. 3 is an isometric view of the flange adapter of a preferred embodiment, illustrating two of the components illustrated in FIG. 1 and circumferential bolt assemblies.
Figures 4, 5:
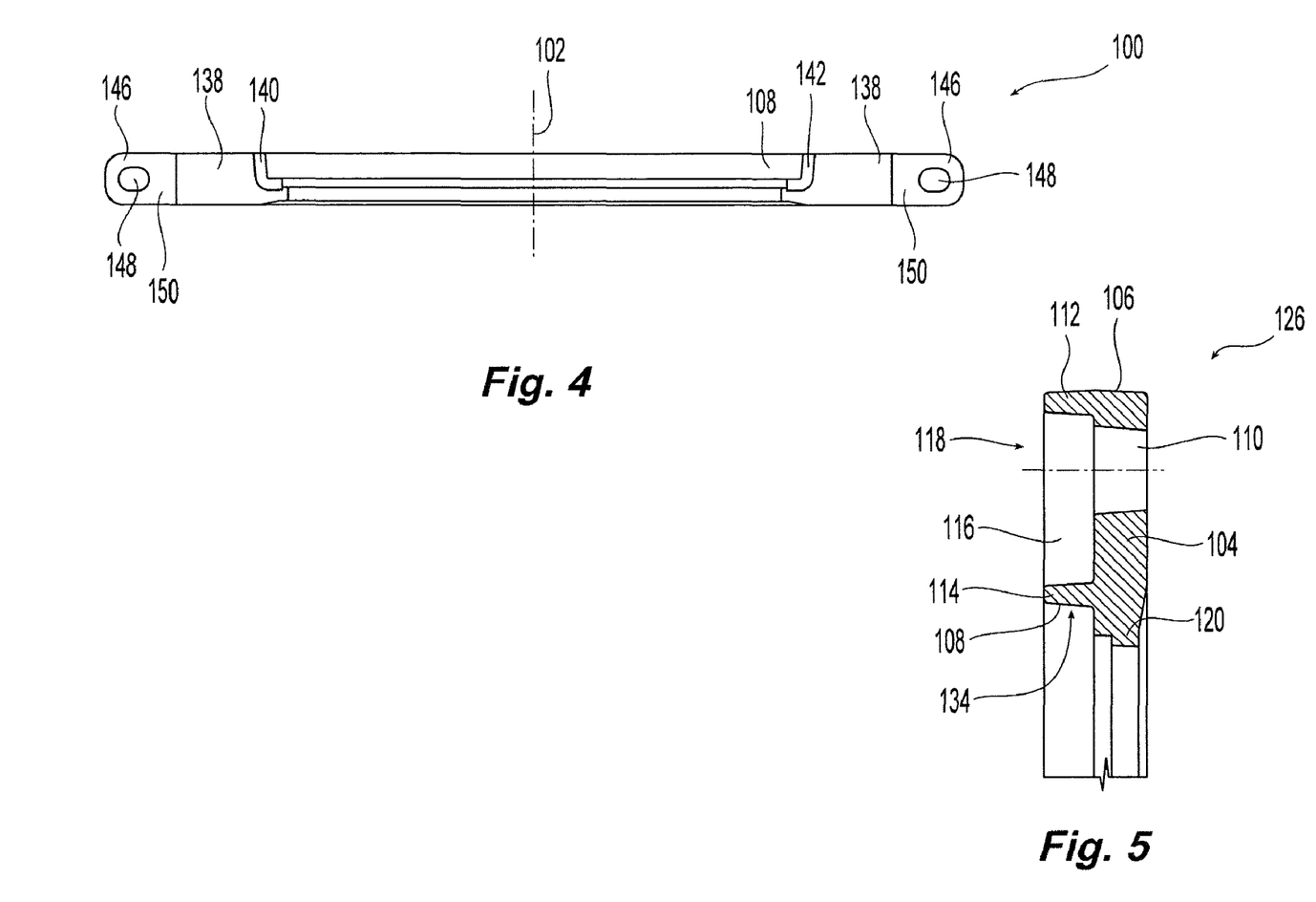
FIG. 4 is a bottom view of the component illustrated in FIGS. 1 and 2.
FIG. 5 is a cross-sectional view of a portion of the component illustrated in FIG. 1.
Figure 6:
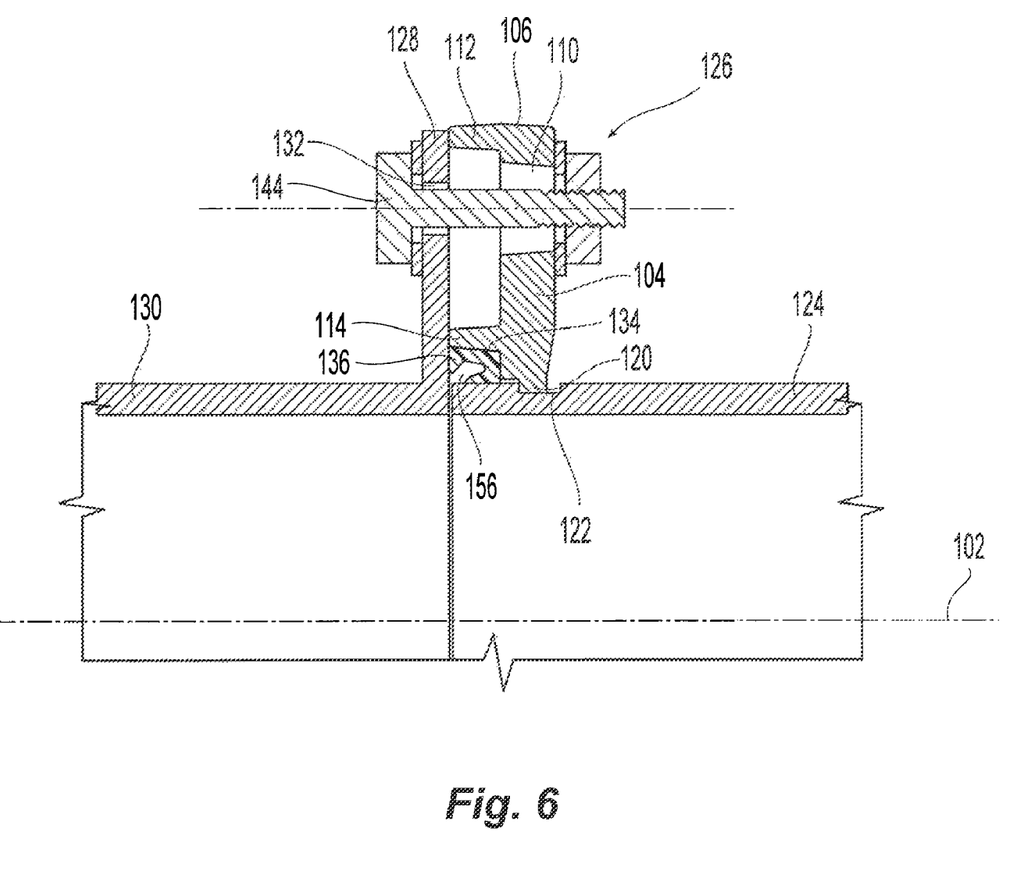
FIG. 6 is the cross-sectional view of FIG. 5 illustrated with cross sections of a grooved pipe, a flanged pipe, a gasket, and a bolt assembly.
Figure 7:
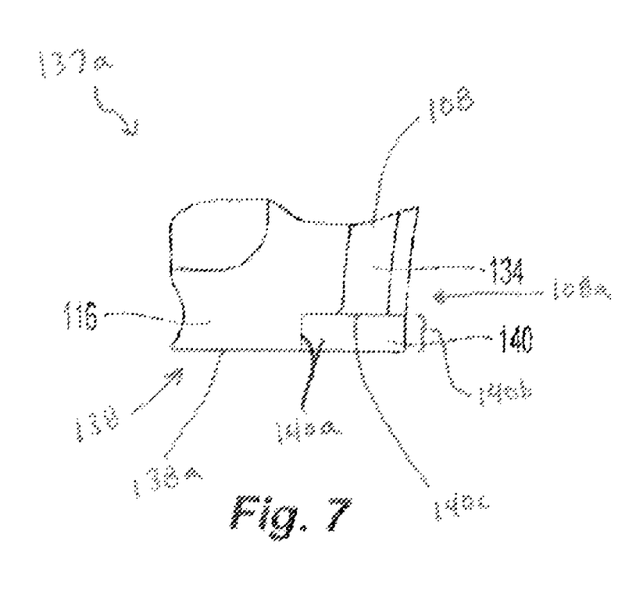
FIG. 7 is an expanded view of a portion of the component illustrated in FIGS. 1 and 4.
Figure 8:
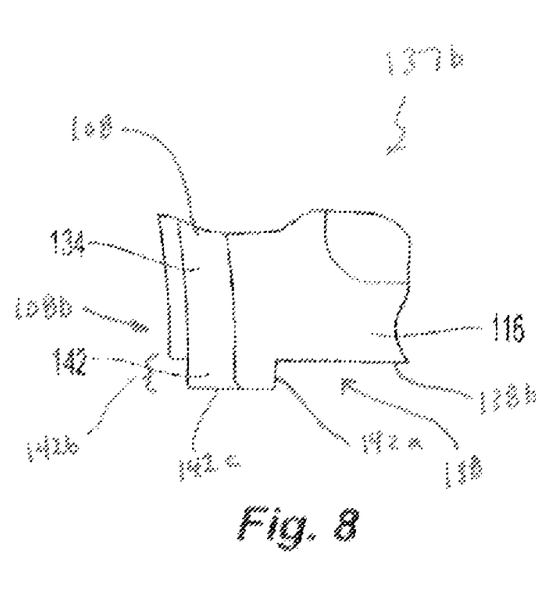
FIG. 8 is an expanded view of a portion of the component illustrated in FIGS. 1 and 4.

As best illustrated in FIGS. 5 and 6, the inner diameter surface 108 of the flange body has an inner tongue 120 extending circumferentially along the inner diameter surface 108 and extending radially from the inner diameter surface 108 towards the longitudinal axis 102 (not shown in FIG. 5). The tongue 120 is designed to engage a groove 122 in a grooved pipe 124, as illustrated in FIG. 6. When the flange part 100 is in place over the grooved pipe 124 so that the tongue 120 is seated in the groove 122 of the grooved pipe 124, the flange body 100 is positioned so that an adapter flange 126 can engage a flange 128 of a flanged pipe 130. The series of bolt holes 110 in the flange body 104 are positioned to align with bolt holes 132 in the pipe flange 128. As illustrated in FIGS. 3 and 7-8, the inner diameter surface 108 also has a first terminal end 108a and an opposing second terminal end 108b, and a channel 134 extending circumferentially from the first terminal end 108a to the second terminal end 108b on a side proximate to the adapter flange 126. The channel 134 is formed to hold a gasket 136 that provides a seal between the grooved pipe 124 and flanged pipe 130.

Figure 1:
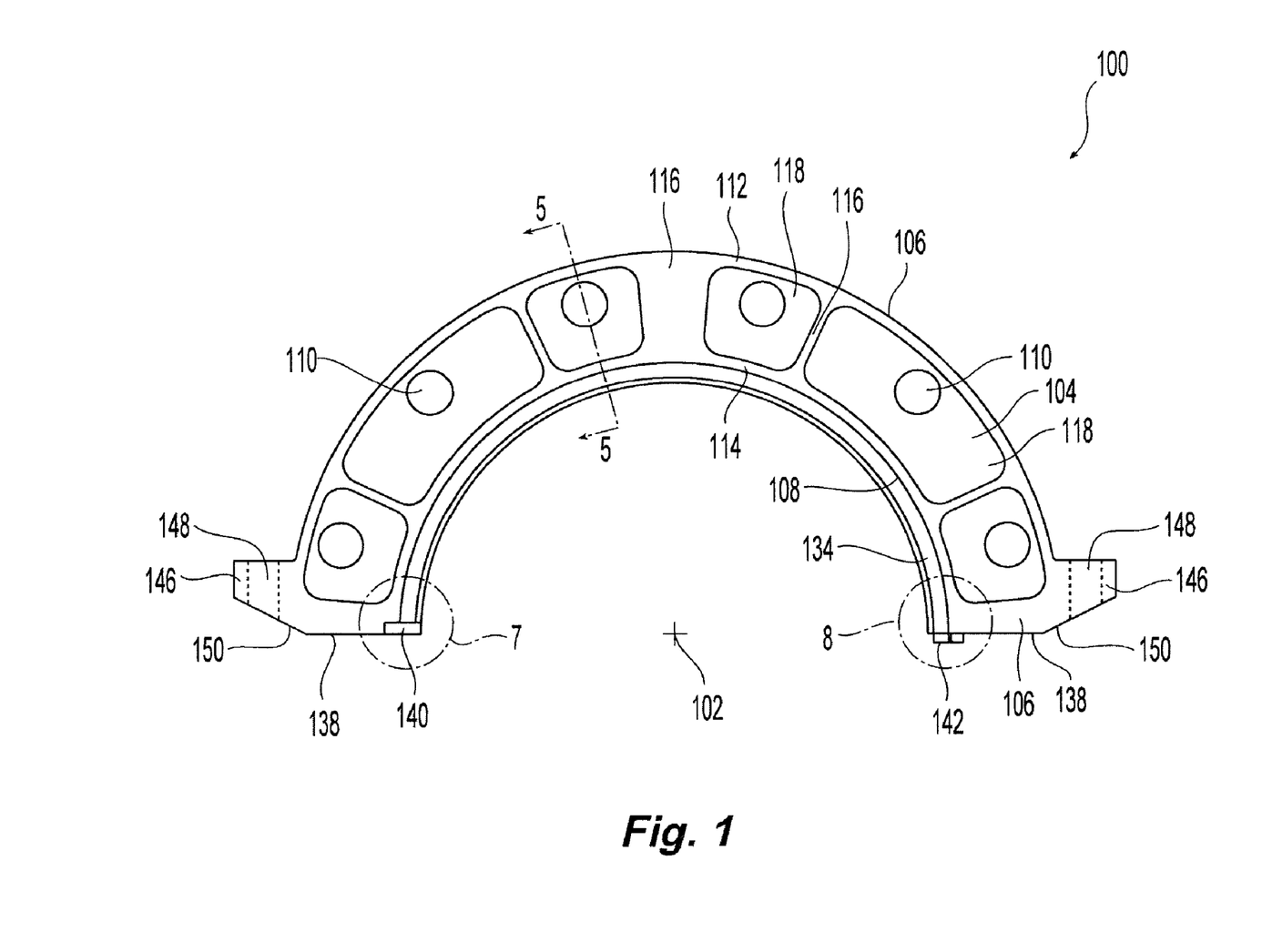
FIG. 1 is a plan front view of a portion of the flange adapter of a preferred embodiment.
Figure 2:
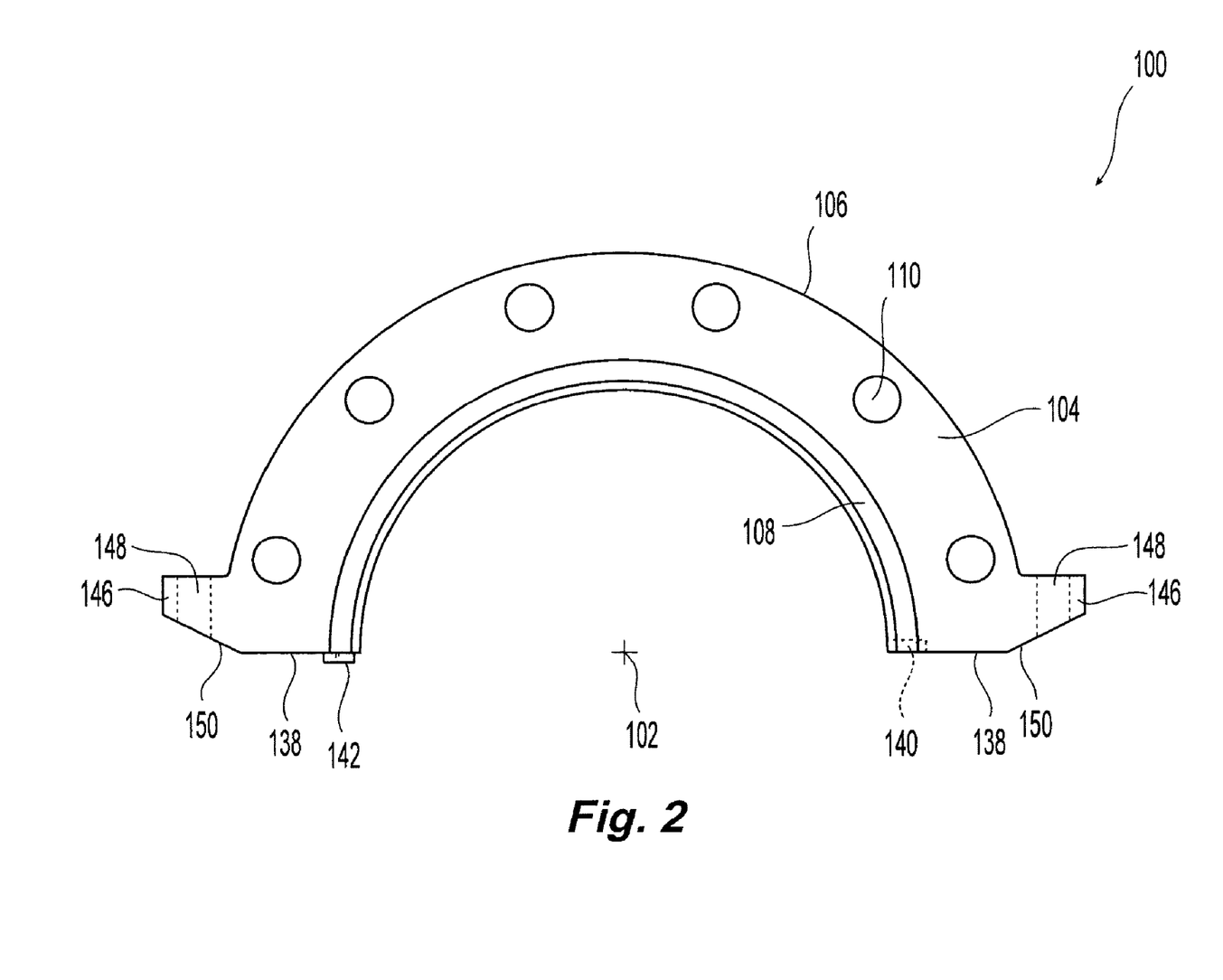
FIG. 2 is a plan rear view of the component illustrated in FIG. 1.

As illustrated in FIGS. 1-4 and 7-8, the arc forming the flange part 100 has a first flange member end 137a and an opposing second flange member end 137b. Each end of the arc forming the flange part 100 is aligned along a plane intersecting the longitudinal axis 102. One end of the arc has a planar mating surface or planar end surface 138 and a notch 140, and the other end has a planar mating surface or planar end surface 138 and a projection 142. As illustrated in FIGS. 3 and 7-8, a first planar end surface 138a and a notch surface 140a are located at the first flange member end 137a and a second planar end surface 138b and a projection surface 142a are located at the second flange member end 137b. As also illustrated in FIGS. 7-8, the notch 140 also has a notch depth 140b and a terminal end of the notch 140c, and the projection 142 also has a projection height 142b and a terminal end of the projection 142c. The planar mating surfaces 138 are aligned on a plane intersecting the longitudinal axis 102. As illustrated in FIGS. 1 and 7, the notch 140 is at an end of the channel 134 and is formed to have a shape that is similar to but larger than the channel 134. As illustrated in FIGS. 1 and 8, the projection 142 is formed at the other end of the channel 134 and extends past the end of the flange body 104 to continue the channel 134. The notch 140 has a complimentary design compared to the projection 142, with the notch 140 being slightly larger than the projection 142. Each of the series of longitudinal bolt holes 110 passing longitudinally through the flange body 104 is preferably positioned away from the planar mating surfaces 138 so as to not interrupt the continuity of the planar mating surfaces 138, and to permit the use of relatively thicker radial ridges 116 adjacent to each planar mating surface 138. Also, longitudinal bolt assemblies 144 connecting the adapter flange 126 to the pipe flange 128 preferably pass through only a single flange part 100, with no bolts passing through a longitudinal bolt hole 110 shared between two flange parts 100, as seen with some existing designs.

Also at each end of the arc forming the flange part 100 is an extension 146 extending radially outward from the flange body 104. The extension 146 has a circumferential bolt hole 148 through the extension 146 and aligned so that an axis of the circumferential bolt hole 148 is orthogonal to the longitudinal axis 102 and orthogonal to the plane aligned with the planar mating surfaces 138. The circumferential bolt holes 148 are preferably oval with each hole having at least two axes parallel with each other. Each extension 146 also has an angled surface 150 adjacent to the planar mating surface 138.

As can be appreciated from FIG. 3, when one flange part 100 is placed next to another flange part 100, the planar mating surfaces 138 can be made to abut each other and the projections 142 and notches 140 of the flange parts 100 can be made to align with each other so that the projection 142 of one flange part 100 is disposed in the notch 140 of the abutting flange part 100. As can also be appreciated from FIGS. 1-3, when two flange parts 100 are disposed adjacent each other with corresponding projections 142 and notches 140 engaging each other, the abutting flange parts 100 are aligned with each other by interlocking of the projections 142 and notches 140. This alignment facilitates the alignment of the circumferential bolt holes 148 of one flange part 100 with the corresponding circumferential bolt holes 148 of another flange part 100.

Preferably, the flange parts 100 and gasket 136 are sized for coupling pipes having a diameter of more than 12 inches. In an exemplary 14-inch configuration, the flange part 100 extends over an arc of approximately 180 degrees, the projection 142 preferably extends from the planar mating surface 138 by 0.250 of an inch, and the notch 140 preferably has a depth of 0.310 of an inch.

The preferred flange adapter illustrated in FIGS. 1-8 provides several advantages. The use of a single notch 140 or projection 142 structure at each end of the arc of the flange part 100 provides for a design that facilitates the casting of the flange part 100. The notch 140 and projection 142 occupy a relatively small portion of the end of the arc, compared to the larger planar mating surface 138, which allows for a single design of the mold used for the casting of each flange part 100 used in the flange adapter 101. The use of a notch 140, and the placement of the notch 140 at the edge of the flange part 100, provides fewer surfaces and corners in the mold design, as compared to designs that place a cavity centrally located on the planar mating surface. Also, a notch is easier to keep clean of debris as compared to a cavity that can collect dirt and other materials that impede the mating of one flange component to another.

Another advantage derives from the engagement between the projections 142 and notches 140 of mating flange parts 100. In other designs, when two planar surfaces are brought together and abut each other, a gasket disposed near the abutting planar surfaces can become pinched between the surfaces as they come together, which could result in an improper fit or damage to the gasket. In the flange adapter 100 of the preferred embodiment, however, the pinching of the gasket 136 is believed to be eliminated because the gasket 136 is not disposed near two tightly-mating surfaces. As illustrated in FIGS. 1 and 7-8, the projection 142 has a length that is slightly less than the depth of the notch 140, i.e., the notch 140 extends to a depth from the planar mating surface 138 that is greater than the height that the projection 142 extends from the planar mating surface 138. Because of this difference in the height of the projection 142 and the depth of the notch 140, the endmost portion of the projection 142 does not bottom out, or abut, the base of the notch 140, and leaves a gap that is large enough to allow the escape of the gasket 136 if pinched by the joining of the two flange parts 100. The projection 142 and notch 140 thus form a shield that is disposed between the gasket 138 and the two mating planar surfaces 138 and each end of the arc.

Yet another advantage relates to the angled surfaces 150 on the extensions 146 of the flange parts 100. The angled surfaces 150 allow the extensions 146 to be made of less material as compared to designs that have planar mating surfaces that extend to the radially-outermost edge of the flange part. Also, the effect of deviations in the smoothness or flatness of the mating planar surfaces are minimized with the use of angled surfaces on the extensions. In designs that do not have angled surfaces, with the planar mating surfaces extending to the radially-outermost edge of the flange part, undesirable projections on the planar mating surfaces of the extensions may impede full contact between the planar mating surfaces disposed nearer to the longitudinal axis. The use of an angled surface 150 ensures that the contact, or the majority of the contact, between abutting planar mating surfaces 138 is disposed on portions of the flange part 100 nearer to the longitudinal axis 102. Another advantage is that the angle surfaces 150 allow circumferential bolt assemblies 152 to compress and partly deflect the extensions 146 towards each other in order to achieve a tighter fit between abutting flange parts 100, as compared to extensions that do not have angled surfaces and that abut directly against an adjacent extension where the circumferential bolt assemblies compress the extensions against each other. Angled surface 150 also allows flange parts 100 to form a clam shell configuration when a circumferential bolt assembly 152 is placed on one side of the flange parts 100.

Still another advantage is that the alignment of the flange parts 100 is simplified because the positioning and interconnecting of corresponding notches 140 and projections 142 determines the alignment of mating flange parts 100, and because the bolt assemblies 144 and 152 do not function primarily as alignment mechanisms. The assembly and installation of the two-piece flange adapter 101 is also simplified because the alignment of the various bolt holes and the insertion of the various bolt assemblies can be achieved with the alignment of only two components. That is, the installation of the longitudinal bolt assemblies 144 is simplified because it requires only the alignment of the longitudinal bolt holes 110 and the pipe flange bolt holes 132, and the installation of the circumferential bolt assemblies 152 is simplified because it requires only the alignment of the circumferential bolt holes 148 of corresponding extensions 146.

In alternative embodiments (not shown), the outer diameter surface 106 can have one or more planar or flattened areas with a radially extending eye bolt hole bored into the flange part 100. The eye bolt hole can be threaded to accept an eye bolt to permit the hoisting of the flange part 100. The eye bolt hole is preferably bored into an area of the flange part 100 having a radial ridge 116 so as to better support the eye bolt hole and the engagement with the eye bolt, and most preferably the radial ridges 116 can be made with a relatively greater circumferential thickness reinforcing the eye bolt holes.

Figure 9:
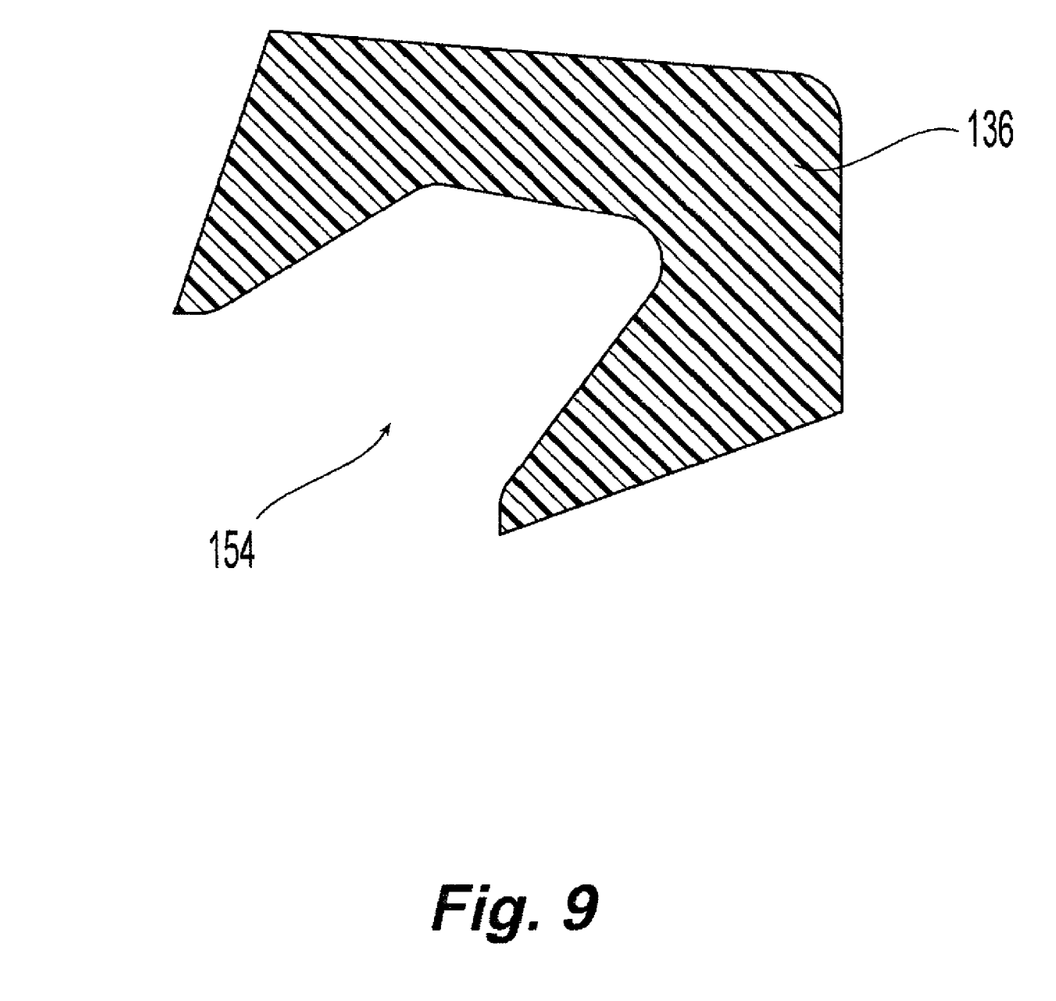
FIG. 9 is a cross-sectional view of a portion of the gasket illustrated in FIG. 6 in a non-compressed state.

FIG. 9 illustrates a cross-section of the non-compressed gasket 136 shown in compressed form in FIG. 6. The gasket 136 is preferably made of ethylene propylene diene monomer or Nitrile, and most preferably made of ethylene propylene diene monomer. As illustrated in FIG. 9, the gasket 136 has an internal cavity 154. As illustrated in FIG. 6, when used, the gasket 136 is installed in the channel 134 and compressed when the flange body 104, inner ridge 114, grooved pipe 124, and flanged pipe 130 are brought together during assembly. Surfaces of the inner ridge 114, flange body 104, grooved pipe 124, and flanged pipe 130 abutting the gasket 136 define a pocket 156 between these structures in which is disposed the gasket 136 and the internal cavity 154. The internal cavity 154, when the gasket is compressed within pocket 156, provides a pathway for the pressurized fluid within the flanged and grooved pipes 124 and 130 to access the walls of the gasket 136 and press the walls against the corresponding surfaces of the inner ridge 114, flange body 104, grooved pipe 124, and flanged pipe 130 to form a seal.

In existing flange adapters sized for pipes having a diameter greater than 12 inches, it is believed that the correspondingly larger gaskets required for 12+ inch flange adapters may fail to properly seal the connection between the flanged and grooved pipes. Specifically, in larger gasket designs and, in particular, in gaskets sized for use in flange adapters sized for a pipe having a diameter greater than 12 inches, it is believed that the cross-sectional shape of gasket and internal cavity cannot simply be an enlarged version of smaller (12 inch or less) designs because the internal cavity may fail to properly accept the inflow of pressurized fluid, and because the gasket may fail to properly press against the pipes and flange adapter to form a seal.

In FIG. 6, the pocket 156 defines a cross-sectional within which the compressed gasket 136 and internal cavity 154 are disposed. A portion of the pocket 156 is occupied by internal cavity 154 and another portion is occupied by the gasket 136. The cross-section of the pocket 156 and of the gasket 136 each define a corresponding cross-sectional area. In existing gaskets sized for pipes having a diameter of 12 inches or less, it is believed that existing gaskets have cross-sectional areas that occupy 87-92% of the cross-sectional area of the corresponding pocket, as shown in TABLE 1. In FIG. 6, the gasket 136 has a comparatively larger internal cavity providing gasket 136 a cross-sectional area that occupies less than 87% of the pocket 156 cross-sectional area. The gasket 136 cross-sectional area more preferably occupies between approximately 82% and 84% of the pocket 156 cross-sectional area, and most preferably occupies 83.6% (for a 14, 16, 18, or 20 inch-diameter pipe) and 83.8% (for a 24 inch-diameter pipe) of the pocket cross-sectional area, as shown in TABLE 2. The greater internal cavity the embodiments disclosed in FIGS. 6 and 9 and TABLE 2 advantageously provides greater access for pressurized fluid interacting with gaskets 136 sized for pipes having diameters greater than 12 inches, thereby providing a more effective seal.

TABLE 1

| pipe diameter corresponding to gasket (inches) | pocket cross-sectional area (square inches) | gasket cross-sectional area (square inches) | % of pocket cross-sectional area occupied by gasket |
| --- | --- | --- | --- |
| 2 | 0.1567 | 0.1445 | 92% |
| 2½ | 0.1567 | 0.1445 | 92% |
| 3 | 0.1658 | 0.1445 | 87% |
| 4 | 0.1657 | 0.1445 | 87% |
| 5 | 0.1597 | 0.1445 | 90% |
| 6 | 0.1932 | 0.1711 | 89% |
| 8 | 0.2435 | 0.2190 | 90% |
| 10 | 0.2797 | 0.2498 | 89% |
| 12 | 0.2797 | 0.2498 | 89% |

TABLE 2

| pipe diameter corresponding to gasket (inches) | pocket cross-sectional area (square inches) | gasket cross-sectional area (square inches) | % of pocket cross-sectional area occupied by gasket |
| --- | --- | --- | --- |
| 14 | 0.3422 | 0.2862 | 83.6% |
| 16 | 0.3422 | 0.2862 | 83.6% |
| 18 | 0.4318 | 0.3611 | 83.6% |
| 20 | 0.4318 | 0.3611 | 83.6% |
| 24 | 0.4711 | 0.3946 | 83.8% |

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

It is claimed:

1. A two-piece flange adapter for connecting a flanged pipe to a grooved pipe, comprising:
   at least two flange members, each flange member comprising:
   first and second flange member ends, the first flange member end having a first planar end surface and the second flange member end having a second planar end surface, the planar end surfaces each disposed in a plane parallel to and passing through a longitudinal axis of the flange member;
   a flange portion having at least one surface for engagement with the flanged pipe, the at least one surface defining a series of longitudinal bolt holes extending longitudinally through the flange portion;
   a tongue portion having a least one surface for engagement with the grooved pipe;
   an inner diameter surface extending between a first terminal end at the first flange member end and a second terminal end at the second flange member end to define a channel configured to support a gasket;
   a notch at the first flange member end defined by a notch surface adjacent to the first terminal end of the inner diameter surface, the notch disposed between the first planar end surface and the longitudinal axis, the notch having a notch depth extending between the first planar end surface and a terminal end of the notch; and
   a projection at the second flange member end defined by a portion of the inner diameter surface and a projection surface adjacent to the second terminal end of the inner diameter surface, the projection disposed between the second planar end surface and the longitudinal axis, the projection having a projection height extending between the second planar end surface and a terminal end of the projection, the projection height being less than the notch depth.

2. The two-piece flange adapter of claim 1, the projection of at least one of the at least two flange members being configured to be disposed adjacent to the notch of the other of the at least two flange members.

3. The two-piece flange adapter of claim 1, wherein the at least two flange members include a first flange member and a second flange member.

4. The two-piece flange adapter of claim 3, the first planar end surface of the first flange member being configured to abut the second planar end surface of the second flange member.

5. The two-piece flange adapter of claim 1, the two-piece flange adapter defining a diameter of more than twelve inches.

6. A two-piece flange adapter for connecting a flanged pipe to a grooved pipe, comprising:
   a first flange member having a first inner surface and first flange ends disposed at opposing ends of an arcuate flange body, the first flange member having a surface defining a series of longitudinal bolt holes extending longitudinally through the first flange member; and
   a second flange member having a second inner surface and second flange ends disposed at opposing ends of an arcuate flange body, the second flange member having a surface defining a series of longitudinal bolt holes extending longitudinally through the second flange member, each second flange end of the second flange member mating with a corresponding first flange end of the first flange member at mating planar end surfaces, the first and second flange members defining a longitudinal axis of the two-piece flange,
   the first and second inner surfaces facing the longitudinal axis and defining a channel configured to support a gasket, the first inner surface having a terminal end adjacent to the first flange end and disposed within a notch defined by a notch surface at the second flange end, at least a portion of the notch surface being disposed between the terminal end adjacent to the first flange end and the planar end surface of the mating second flange end.

7. The two-piece flange adapter of claim 6, further comprising:
   the inner surface of the second flange member defining a terminal end disposed within a notch defined by the first flange end.

8. A two-piece flange adapter for connecting a flanged pipe to a grooved pipe, comprising:
   a first flange member having an inner surface and flange ends disposed at opposing ends of an arcuate flange body to define an inner circumference of the first flange member, the first flange member having a surface defining a series of longitudinal bolt holes extending longitudinally through the first flange member; and
   a second flange member having an inner surface and flange ends disposed at opposing ends of an arcuate flange body to define an inner circumference of the second flange member, the second flange member having a surface defining a series of longitudinal bolt holes extending longitudinally through the second flange member, each end of the second flange member mating with a corresponding end of the first flange member, the first and second flange members defining a longitudinal axis of the two-piece flange adapter,
   the inner surfaces of the first and second flange members facing the longitudinal axis and defining a channel configured to support a gasket, the inner surface of the first flange member having a terminal end with a projection surface defining a projection, the inner surface of the second flange member having a terminal end with a notch surface defining a notch, the projection being disposed within the notch to define a gap between the projection and the notch.

9. A two-piece flange adapter for connecting a flanged pipe to a grooved pipe, comprising:
   at least two flange members, each flange member including:
   a flange portion having at least one surface for engagement with the flanged pipe, the at least one surface defining a series of longitudinal bolt holes extending longitudinally through the flange portion;
   a tongue portion having a least one surface for engagement with the grooved pipe; and
   a flange body with first and second flange body ends and an inner diameter surface defining a longitudinal axis, the flange body having a first planar end surface at the first flange body end and a second planar end surface at the second flange body end, the planar end surfaces each disposed in a plane parallel to and passing through the longitudinal axis, the inner diameter surface defining a channel, the inner diameter surface having first and second terminal ends corresponding to the first and second flange body ends of the flange body, the first terminal end terminating at a notch abutting the first planar end surface and the second terminal end terminating at a projection adjacent the second planar end surface, the projection being disposed between the longitudinal axis and the second planar end surface; and
   a gasket at least in part disposed in the channel, the gasket having a surface defining an internal cavity of the gasket facing the longitudinal axis, the gasket having a compressed configuration defining a cross-sectional pocket including a cross-sectional area of the gasket and a cross-sectional area of the internal cavity, the cross-sectional area of the gasket being less than 87% of the cross-sectional area of the pocket.

10. A two-piece flange adapter for connecting a flanged pipe to a grooved pipe, comprising:
    a first flange member having an inner surface and flange ends disposed at opposing ends of an arcuate flange body, the first flange member having a surface defining a series of longitudinal bolt holes extending longitudinally through the first flange member;
    a second flange member having an inner surface and flange ends disposed at opposing ends of an arcuate flange body, the second flange member having a surface defining a series of longitudinal bolt holes extending longitudinally through the second flange member, each end of the second flange member mating with a corresponding end of the first flange member, the first and second flange members defining a longitudinal axis of the two-piece flange adapter, the inner surfaces of the first and second flange members facing the longitudinal axis and defining a channel configured to support a gasket, the inner surface of the first flange member defining a terminal end disposed within a notch defined by a notch surface at one of the flange ends of the second flange member, at least a portion of the notch surface being disposed between the terminal end and the one of the flange ends of the second flange member; and
    a gasket at least in part disposed in the channel, the gasket having a surface defining an internal cavity of the gasket facing the longitudinal axis, the gasket having a compressed configuration defining a cross-sectional pocket including a cross-sectional area of the gasket and a cross-sectional area of the internal cavity, the cross-sectional area of the gasket being less than 87% of the cross-sectional area of the pocket.

11. The two-piece flange adapter of claim 10, the two-piece flange adapter defining a diameter of more than twelve inches.

12. A gasket-adapter assembly, comprising:
- a two-piece flange adapter having abutting end surfaces and an inner circumferential surface defining a channel, at least one piece of the two-piece adapter having a projection at an end of the channel, the projection being disposed between the channel and at least one of the abutting end surfaces;
- a gasket at least in part disposed in the channel, the gasket having a surface defining an internal cavity of the gasket facing a longitudinal axis defined by the two-piece flange adapter, the gasket having a compressed configuration defining a cross-sectional pocket including a cross-sectional area of the gasket and a cross-sectional area of the internal cavity, the cross-sectional area of the gasket being less than 87% of the cross-sectional area of the pocket.

13. A gasket-adapter assembly of claim 12, the cross-sectional area of the gasket being between approximately 82% and 84% of the cross-sectional area of the pocket.

14. A gasket-adapter assembly of claim 12, the cross-sectional area of the gasket being approximately 83.6% of the cross-sectional area of the pocket.

15. A gasket-adapter assembly of claim 14, the gasket-adapter assembly being sized for use with at least one of a 14-inch diameter pipe, a 16-inch diameter pipe, a 18-inch diameter pipe, and a 20-inch diameter pipe.

16. A gasket-adapter assembly of claim 12, the cross-sectional area of the gasket being approximately 83.8% of the cross-sectional area of the pocket.

17. A gasket-adapter assembly of claim 16, the gasket-adapter assembly being sized for use with a 24-inch diameter pipe.

* * * * *